Patented Oct. 9, 1951

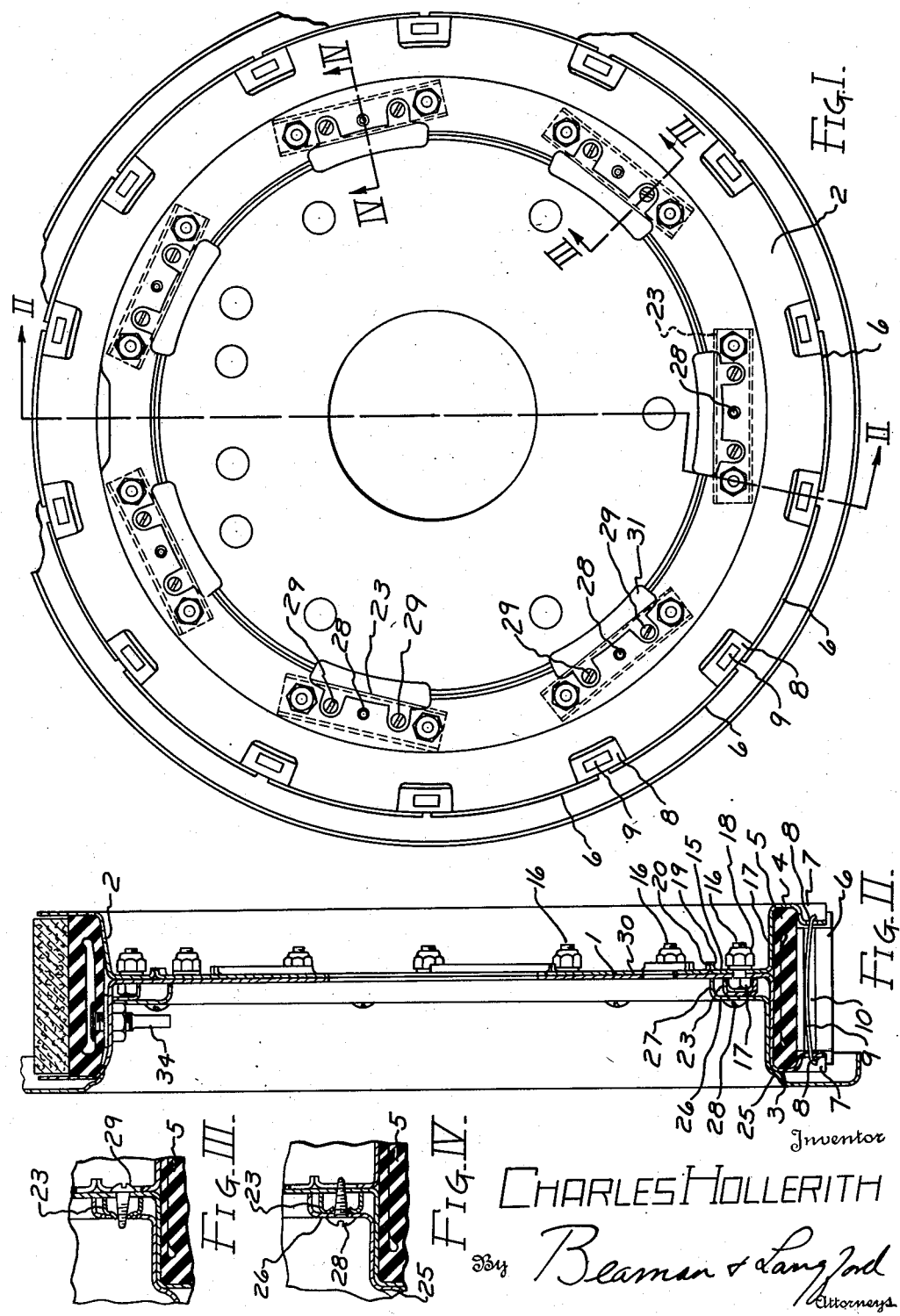

2,570,345

UNITED STATES PATENT OFFICE 2,570,345

EXPANDER TUBE BRAKE CONSTRUCTION

Charles Hollerith, Jackson, Mich., assignor, by mesne assignments, to The B. F. Goodrich Company, Akron, Ohio, a corporation of New York Application December 29, 1945, Serial No. 638,312

4 Claims. (Cl. 188—152)

The present invention relates to hydraulic wheel brakes of the type embodying expander tubes and brake blocks and, more particularly, to a detail in the construction of the expander tube and brake block supporting structure.

In hydraulic wheel brakes of the type employing an expander tube and brake blocks, such as disclosed in my Patent 2,350,038, the expander tube and brake block members are commonly held in a sheet metal channel structure. The channel structure is generally made up of two oppositely arranged sheet metal stampings which are secured together. It is desirable to be able to readily remove one side of the channel structure. However, prior art structures do not permit such removal, the stampings being permanently secured together.

The present invention provides a practical solution to the problem by providing a readily assemblable structure which facilitates the ready removal and replacement of one side of the expander tube and brake block supporting channel.

An object of the present invention is to provide, in a hydraulic brake assembly, an expander tube and brake block support having a readily detachable side section.

Another object of the invention is to provide in a hydraulic brake assembly a separable torque plate and fairing assembly.

Still another object of the invention is to provide in a hydraulic brake assembly a novel structure for retaining bolts employed in a quickly detachable supporting member sub-assembly.

A further object of the invention is to provide a structure for readily assembling bolts on a sheet metal member.

A still further object of the invention is to provide a novel manner of securing a channel member for locking in position bolt heads with respect to a sheet metal support.

These and other objects will be apparent from the following specification and claims, when taken with the accompanying drawings, in which Fig. 1 is a side elevation of a partial brake assembly incorporating the present invention, Fig. 2 is a section on the line II—II of Fig. 1, Fig. 3 is a section on the line III—III of Fig. 1, and Fig. 4 is a section on the line IV—IV of Fig. 1.

Referring particularly to the drawings, the reference character 1 indicates a torque disc or plate having a channel forming rim flange 2 on the periphery thereof. The rim 2 is in the form of a channel having sides 3 and 4 and carrying therein an expander tube 5 preferably of rubber and a plurality of circumferentially spaced brake blocks 6. The sides 3 and 4 are each provided with circumferentially spaced inwardly extending indentations 7. The indentations 7 have openings 8 through each pair of which extends a retraction spring 9. The retraction springs 9 engage in slots 10 in the ends of the brake blocks 6 for locking the brake blocks 6 in the channel defined by the sides 3 and 4 and for retracting them from engagement with the brake shoe, not shown. The structure as broadly defined hereinabove is old and is disclosed more in detail in my Patent 2,350,038.

The present invention comprises among other features the detachable mounting of the side 4 on the torque plate 1.

The side 4 is provided with an integral, radially inwardly extending annular flange or ring plate 15 extending in overlapping relation with the torque plate 1. The channel forming flange or side 4 and flange or ring plate 15 may be a single sheet metal stamping or otherwise fabricated. The flange or ring plate 15 is bolted to the torque disc or plate 1 by a plurality of circumferentially spaced bolts 16 having heads 17 and nuts 18 such as "elastic stop nuts." The inner periphery of the flange 15 is provided with a drawn-up rim 19 and is in concentric and in contacting relation with a drawn-up edge 20 of one of the plates of the torque flange 1. The edges 19 and 20 are for the purpose of locating the flange 15 and thus the sides 4 when the same are being assembled on the torque plate 1 after previous removal.

The heads 17 of the bolts 16 are locked against rotation with respect to the torque plate 1 by a plurality of straight channels 23. The inner width of the channels is approximately the same as that of the heads 17 across the flats thereof so that when the heads 17 are disposed in the channels 23 and the channels 23 are maintained against movement, the heads 17 are locked against rotation. The channels 23 also serve to prevent the movement of the bolts 16 outwardly from the torque plate 1.

Associated with the brake structure disclosed is a fairing ring 25 in the form of an annular sheet metal stamping. The fairing 25 has a radially inwardly extending flange 26 which is provided with a broad, annular edge portion 27. The flange 26 overlaps the channels 23, and the edge portion 27 which extends around the entire inner periphery of the flange 26, has the same inner axial dimension as the outer axial dimension of the channels 23.

The flange 26 is secured to each of the channels 23 by sheet metal screws 28 extending through the flange 26 and into threaded engagement with the channels 23. This connection is shown particularly in Fig. 4. There is one screw 28 associated with each channel member 23. The channel members 23 are secured to the torque plate 1 by screws 29 extending through the torque plate 1 and into threaded engagement with the channels 23, particularly as shown in Fig. 3. As shown in Fig. 1, there are two screws 29 for each channel member 23. In order to prevent interference between the screws 29 and the flange 15, there is cut out from the flange 15 and also from the adjacent torque plate portion 30 an irregularly shaped opening 31. The enlargement of the opening 31 beyond the provisions for the screws 29 is of advantage when applying the flange 15 and the side 4 to the torque plate.

The expander tube 5 is provided with an inlet nozzle 34 with which may be associated a suitable structure, not shown, for making a connection to a source of hydraulic fluid under pressure. However, it is to be understood that the particular form of expander tube and brake block as well as the nozzle 34 are not of importance or essential to the present invention.

The drawings illustrate one form that the invention may take. It is contemplated, however, that other forms may be employed. Accordingly, I do not wish to be limited except by the scope of the following claims.

Having thus described my invention, what I desire to secure by Letters Patent and claim is:

1. In an expander tube brake structure, a combination channel rim for expander tube and torque flange, comprising a pair of sheet metal stampings having outer peripheral portions collectively defining an annular channel rim with inwardly extending radial portions in contiguous relation to collectively define a two-ply radial torque flange portion directly adjacent said rim, one of said stampings having a radial portion extending inwardly to complete the radial inward extension of the torque flange, the other of said stampings having its radial portion terminated adjacent said rim, means for removably securing said last stamping to said first stamping, and a third stamping completing the two-ply radial structure of said torque flange and contiguous with said first stamping, the inner periphery of said second stamping and the outer periphery of said third stamping having edge portions adapted for mutual engagement to pilot one stamping upon the other to facilitate the assembly of said second stamping upon said first stamping.

2. A brake structure comprising in combination a torque disc, a channel forming flange on the outer periphery of said disc, a ring plate, said plate having a channel forming flange, means removably mounting said ring plate upon one side of said torque disc in contiguous relation thereto and in position to define a peripherally divided rim channel adapted to support an expander tube and brake shoes, said mounting means comprising a circumferentially spaced series of bolts extending through corresponding and registering holes in the said torque disc and ring plate and having their heads located on the outside surface of the torque disc remote from the said ring plate, said bolts having removable nuts engaging their opposite ends and the outside surface of the ring plate, members extending between adjacent pairs of said bolt heads and formed to engage over the latter to hold them against rotation, a fairing ring on one side of said channel, and means removably securing said fairing ring upon said nut rotation restraining members.

3. A brake structure comprising in combination a torque disc, a channel forming flange on the outer periphery of said disc, a ring plate, said plate having a channel forming flange, means removably mounting said ring plate upon one side of said torque disc in contiguous relation thereto and in position to define a peripherally divided rim channel adapted to support an expander tube and brake shoes, said mounting means comprising a circumferentially spaced series of bolts extending through corresponding and registering holes in the said torque disc and ring plate and having their heads located on the outside surface of the torque disc remote from the said ring plate, said bolts having removable nuts engaging their opposite ends and the outside surface of the ring plate, channel shaped members mounted over the heads of adjacent pairs of the said bolts to engage the heads of the latter and hold the bolts against rotation, a fairing ring on one side of said channel, said fairing ring having its inner peripheral portion formed and disposed to overlap said channel shaped members, securing means for said fairing ring engaging said channel ring bases to removably secure the fairing ring thereto, and means independently and removably securing said channel-shaped members to said torque disc.

4. A brake structure comprising in combination a torque disc, a channel forming flange on the outer periphery of said disc, a ring plate, said plate having a channel forming flange, means removably mounting said ring plate upon one side of said torque disc in contiguous relation thereto and in position to define a peripherally divided rim channel adapted to support an expander tube and brake shoes, said mounting means comprising a circumferentially spaced series of bolts extending through corresponding and registering holes in the said torque disc and ring plate and having their heads located on the outside surface of the torque disc remote from the said ring plate, said bolts having removable nuts engaging their opposite ends and the outside surface of the ring plate, tangentially disposed channel members extending between adjacent pairs of said bolt heads in position to engage over the latter and hold the bolts against rotation by the location of said bolt heads within the channel members, a fairing ring on one side of said channel, said fairing ring having its inner peripheral portion formed and disposed to overlap said channel shaped members, securing means for said fairing ring engaging said channel ring bases to removably secure the fairing ring in position, and independent securing means for removably securing said channel-shaped members to said torque disc.

CHARLES HOLLERITH.

REFERENCES CITED

The following references are of record in the file of this patent:

UNITED STATES PATENTS

| Number | Name | Date |
|---|---|---|
| 91,188 | White | June 8, 1869 |
| 1,054,291 | Hancock | Feb. 25, 1913 |
| 1,136,234 | Johnson et al. | Apr. 20, 1915 |
| 1,319,948 | Bodine | Oct. 28, 1919 |
| 2,246,979 | Kraft et al. | June 24, 1941 |
| 2,277,434 | Hollerith | Mar. 24, 1942 |
| 2,386,116 | Hunter | Oct. 2, 1945 |
| 2,394,311 | Keller | Feb. 5, 1946 |